United States Patent [19]

Takahashi et al.

[11] Patent Number: 4,938,494
[45] Date of Patent: Jul. 3, 1990

[54] MOUNTING STRUCTURE OF A REAR-WHEEL STEERING SYSTEM FOR MOTOR VEHICLES

[75] Inventors: Akira Takahashi; Yuji Soejima, both of Tokyo, Japan

[73] Assignee: Fuji Jukogyo Kabushiki Kaisha, Tokyo, Japan

[21] Appl. No.: 287,472

[22] Filed: Dec. 19, 1988

[30] Foreign Application Priority Data

Dec. 26, 1987 [JP] Japan .............................. 62-197699[U]

[51] Int. Cl.$^5$ .............................................. B62D 5/00
[52] U.S. Cl. ....................................... 280/91; 280/96.1; 280/99
[58] Field of Search ................ 280/91, 99, 112.2, 661, 280/772, 788; 180/140

[56] References Cited

U.S. PATENT DOCUMENTS

| 2,437,823 | 3/1948 | Jonkhoff .......................... 280/788 X |
| 4,546,997 | 10/1985 | Smyers .................................. 280/772 |
| 4,660,844 | 4/1987 | Yamamoto et al. .................. 280/91 |

FOREIGN PATENT DOCUMENTS

| 0189678 | 9/1985 | Japan ..................................... 280/91 |
| 61-26677 | 2/1986 | Japan . |
| 62-72270 | 5/1987 | Japan . |

Primary Examiner—Charles A. Marmor
Assistant Examiner—Brian L. Johnson
Attorney, Agent, or Firm—Martin A. Farber

[57] ABSTRACT

A motor vehicle has a crossmember for supporting a rear suspension system. The crossmember has a U-shaped cross section including a front plate and a rear plate. A part of the rear-wheel steering system is mounted on the rear plate of the crossmember, and another part of the rear-wheel steering system is mounted in the crossmember, a part of which is covered by underguards secured to the crossmember.

3 Claims, 2 Drawing Sheets

4,938,494

MOUNTING STRUCTURE OF A REAR-WHEEL STEERING SYSTEM FOR MOTOR VEHICLES

BACKGROUND OF THE INVENTION

The present invention relates to a rear-wheel steering system, and more particularly to a mounting structure of a rear-wheel steering system for a motor vehicle.

A rear-wheel steering system for steering rear wheels together with front wheels is known. Japanese Utility Model Laid-Open No. 61-26677 discloses a steering system disposed in a crossmember provided for supporting rear suspensions, thereby protecting the system from damage caused by the collision with protrusions of road surfaces and by striking of bouncing stones.

In Japanese Utility Model Laid-Open No. 62-72270, a bottom of a trunk room formed in a rear portion of a vehicle is upwardly projected to form a recess under the bottom in which the rear-wheel steering system is provided.

However, in a rear-wheel drive, or a four-wheel drive vehicle, a rear-wheel drive power train including axles is usually disposed in the crossmember for the rear suspensions so that a space is not left in the crossmember for the rear-wheel steering system. Alternatively, the size of the crossmember is increased in order to house the rear-wheel power train. Accordingly, it is difficult to provide an underside recess for receiving the rear-wheel steering system. As a result, in any case, it is difficult to dispose the rear-wheel steering system in such a manner as to protect the system from damages.

SUMMARY OF THE INVENTION

The object of the present invention is to provide a rear-wheel steering system which can be protected from protrusions and bouncing stones on road surfaces.

According to the present invention, there is provided a mounting structure of a rear-wheel steering system for a motor vehicle having a crossmember for supporting a rear suspension system, the crossmember having a U-shaped cross section including a front plate and a rear plate, characterized in that a case housing the first part of the rear-wheel steering system is secured to the rear plate of the crossmember, a second part of the rear-wheel steering system is mounted in the crossmember between the front and rear plates, underguards are secured to the crossmember to cover parts of the second part of the rear-wheel steering system.

In an aspect of the invention, the rear wheel steering system comprises a pair of front and rear lateral links each of which is connected to a supporting member of a rear wheel to form a part of a suspension device for rear wheels, right and left levers and a connecting rod connected to the levers, and right and left shafts pivotally mounted on the crossmember and, the underguards are provided for covering the right and left levers and shafts.

The other objects and features of this invention will become understood from the following description with reference to the accompanying drawings

DETAILED DESCRIPTION OF THE PREFERRED EMBODIMENT

Figure 1:
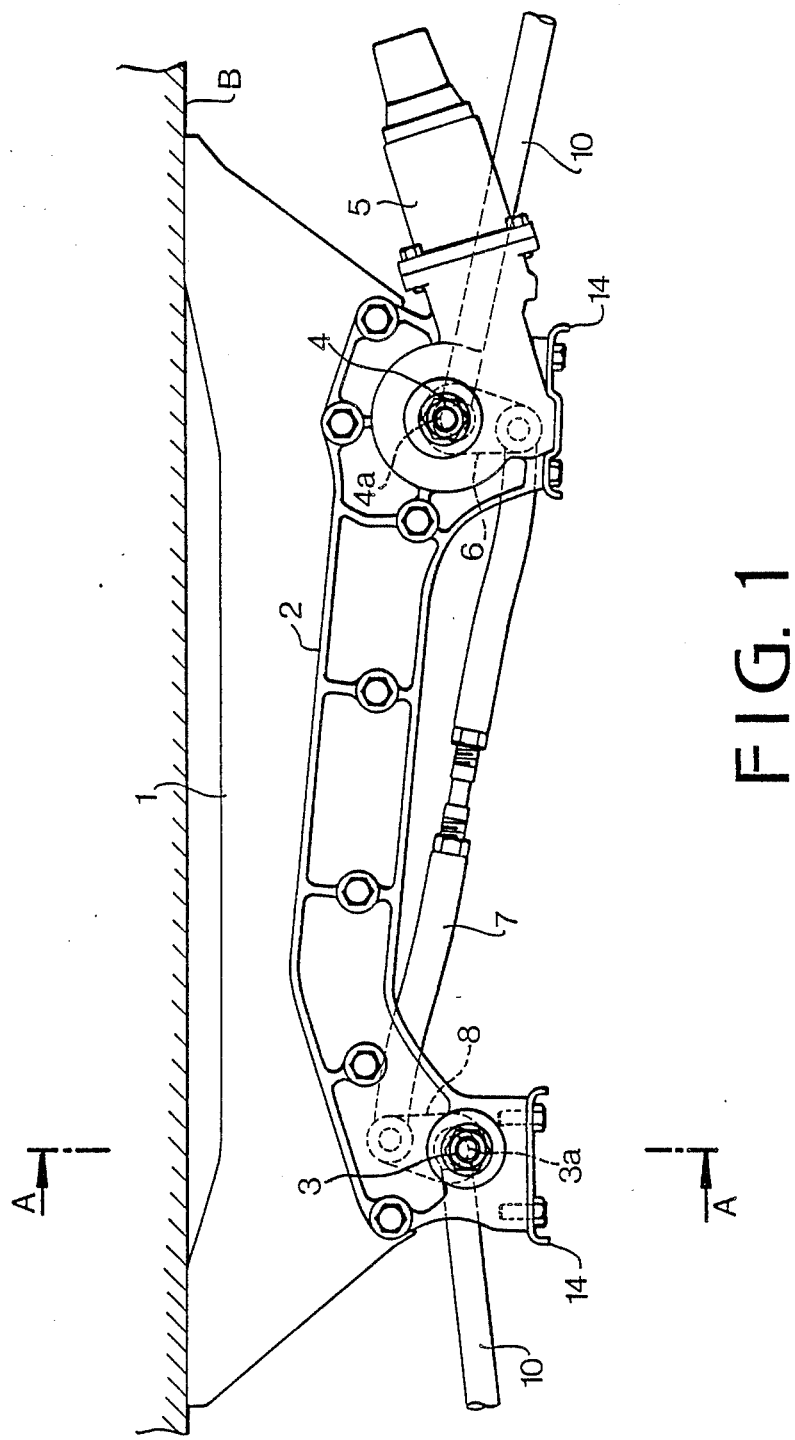
FIG. 1 is an elevational view of a rear-wheel steering system as viewed from the rear of a motor vehicle.
Figure 2:
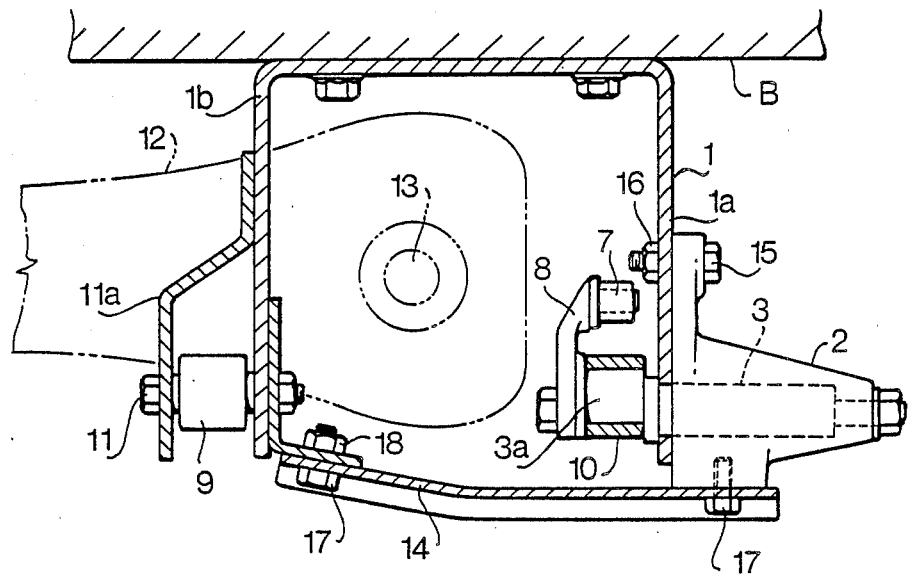
FIG. 2 is a sectional view taken along a line A—A of FIG. 1.

Referring to FIGS. 1 and 2, a suspension crossmember 1, having a U-shaped cross section opened to the ground, is securely mounted on an underside of a body B of a motor vehicle. A case 2 is fixed to a rear plate 1a of the crossmember 1 with bolts 15 and nuts 16. A main portion of a system for steering rear wheels is mounted in the crossmember 1 and the case 2.

The rear-wheel steering system comprises a pair of front and rear lateral links 9 and 10 (FIG. 3) which form a part of a suspension device for rear wheels, right and left levers 6 and 8, and a connecting rod 7 connected to each lever 6 and 8, and shafts 4 and 3. The shafts 4 and 3 are pivotally supported in right and left end portions of the case 2. The right and left shafts 4 and 3 have integral eccentric shaft portions 4a and 3a, respectively, projecting into the crossmember 1. Inner ends of the lateral links 10 are pivotally mounted on the eccentric shaft portions 4a and 3a, and levers 6 and 8 are fixedly mounted on the center shaft portions of the shafts 3 and 4, respectively. The inner end of each of the front lateral links 9 is pivotally mounted on a shaft 11 which is securely supported between a front plate 1b of the crossmember 1 and a cover 11a attached thereto. The outer end of each of the lateral links 9 and 10 is pivotally connected to a rear-wheel supporting member for rear wheels W, interposing resilient bushes made of rubber, for example. Thus, the lateral links 9 and 10 are able to swing about the shafts 11 and eccentric shaft portion 3a, thereby serving as rear-wheel suspension arms.

Further, in the crossmember 1, a rear differential 12 and rear axles 13 are disposed.

An electric motor 5 is provided in the case 2 adjacent the right shaft 4. The rotary shaft of the motor 5 is connected to the shaft 4 through a worm gear device so as to pivot the shaft 4 for steering the rear wheels W.

The bottom of the crossmember 1 is partially covered with a pair of underguards 14, the front and rear portions of which are respectfully fastened to the front plate 1b of the crossmember 1 and the underside of the case 2 by bolts 17 and nuts 18. Thus, mechanical main parts of the rear-wheel steering system such as the shaft 3, 4, levers 6, 8 and the connecting portions of the connecting rod 7 are protected.

In operation, when the front wheels are steered, the motor 5 is driven in accordance with a signal from a control unit (not shown). The rotation of the shaft of the motor 5 is transmitted to the shaft 4 through the worm gear device. Accordingly, the shaft 4 and eccentric shaft portion 4a are pivoted to axially shift the right side link 10. At the same time, the right lever 6 is swung. Therefore, the connecting rod 7 is laterally moved to pivot the left lever 8 and the eccentric shaft portion 3a. Thus, the left link 10 is also shifted in the same direction as the right link 10 by the rotation of the eccentric shaft.

Figure 3:
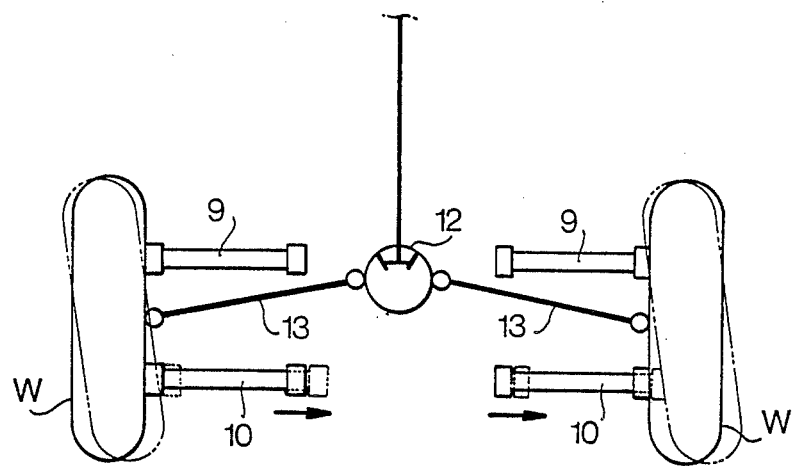
FIG. 3 is a schematic plan view of the rear-wheel steering system.

Referring to FIG. 3, when the links 10 are moved to the right as shown by arrows, each rear wheel W is steered about the end of the link 9 as shown by a chain line.

In the arrangement of the rear-wheel steering system described above, the eccentric shaft portions 3a and 4a and rotating the portion of the levers 6 and 8 are covered by the underguards 14 so as to be completely protected against damage caused by stones flung up by the rotating wheels or by projections on rough roads. Since the connecting rod 7 is simply a rod or a pipe, it is less prone to be damaged.

In addition, since the crossmember is structured so as to be partly closed at the bottom, the rigidity thereof and the mounting strength are increased.

From the foregoing, it will be understood that the present invention provides a rear-wheel steering system where only a part thereof is provided in a crossmember so that the size of the crossmember is not increased. Accordingly, the rear wheel steering system can be disposed together with a power train for the rear wheels.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A mounting structure of a rear-wheel steering system for a motor vehicle having a crossmember for supporting a rear suspension system, the crossmember having a U-shaped cross section including a front plate and a rear plate, comprising
   a case housing a first part of the rear-wheel steering system comprising right and left shafts is secured to the rear plate of the crossmember;
   a second part of the rear-wheel steering system is mounted in the crossmember between the front and rear plates;
   underguards are secured to the crossmember at least one of below and adjacent said front and rear plates so as to form a bottom portion for said U-shaped cross section crossmember to cover portions of the second part of the rear-wheel steering system;
   the second part of the rear-wheel steering system comprises a pair of front and rear lateral links each of which is operatively connected to a corresponding rear wheel to form a part of a suspension device for rear wheels, right and left levers connected to said right and left shafts respectively, the latter being pivotally mounted on the case, and a connecting rod connected to said levers;
   the underguards covering said right and left levers and shafts;
   the right and left shafts have integral eccentric shaft portions respectively projecting into the crossmember, and
   inner ends of the rear lateral links are pivotally mounted on the eccentric shaft portions, respectively, and the levers are fixedly mounted on center shaft portions of the shafts, respectively.

2. The mounting structure according to claim 1, wherein
   said front lateral links are pivotally mounted at inner ends thereof on respective shafts fixed to said crossmember.

3. A mounting structure of a rear-wheel steering system for a motor vehicle having a crossmember forming a U-shaped cross section with a front plate and a rear plate extending laterally under said motor vehicle, comprising:
   a case secured on a rear side of said rear plate pivotally housing shafts of said rear-wheel steering system;
   an underguard connected between lower ends of said front and rear plates;
   the rear-wheel steering system comprising a pair of front and rear lateral links connected to rear wheels, respectively, right and left levers connected to said shafts respectively and covered by said underguard thereunder, and a connecting rod connected between said right and left levers;
   each said shaft has an eccentric shaft portion integrally protruding from said shaft into said crossmember;
   an inner end of each of said rear lateral links being pivotably mounted on a respective said eccentric shaft portion;
   respective ends of said right and left levers are connected with said shafts, respectively, so as to move said rear wheels in a same direction simultaneously via said connecting rod and said rear lateral links; and
   said underguard being secured at least one of below and adjacent said front and rear plates so as to form a bottom portion for said U-shaped cross section crossmember.

* * * * *